United States Patent [19]

Mäusezahl

[11] Patent Number: 5,090,964
[45] Date of Patent: Feb. 25, 1992

[54] RED DYE MIXTURES AND THEIR USE: DYEING NATURAL OR SYNTHETIC POLYAMIDES

[75] Inventor: Dieter Mäusezahl, Biel-Benken, Switzerland

[73] Assignee: Ciba-Geigy Corporation, Ardsley, N.Y.

[21] Appl. No.: 615,536

[22] Filed: Nov. 19, 1990

[30] Foreign Application Priority Data

Nov. 28, 1989 [CH] Switzerland .................. 4251/89

[51] Int. Cl.$^5$ .......................................... C09B 49/00
[52] U.S. Cl. ........................................... 8/641; 8/639; 8/683; 8/917; 8/924
[58] Field of Search ................................... 8/641, 683

[56] References Cited

U.S. PATENT DOCUMENTS 4,537,598  8/1985  Schaetzer et al. ................ 8/641

FOREIGN PATENT DOCUMENTS 0139617  5/1985  European Pat. Off. .
0387201  9/1990  European Pat. Off. .
2623178  2/1977  Fed. Rep. of Germany .

Primary Examiner—A. Lionel Clingman
Attorney, Agent, or Firm—George R. Dohmann; Marla Mathias

[57] ABSTRACT

The invention relates to a dye mixture containing a dye of the formula

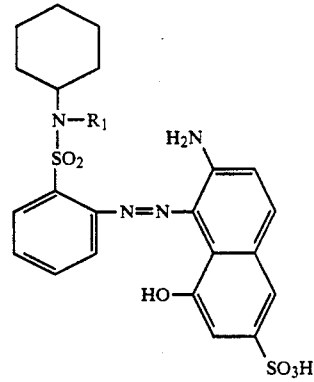

in which $R_1$ is methyl or ethyl and at least one dye of the formula

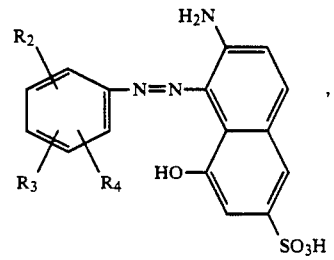

in which $R_2$ is substituted or unsubstituted $C_1$–$C_8$alkyl is halogen, benzoylamino which unsubstituted or substituted in the phenyl ring by halogen, or 1-azacycloheptane-N-sulfonyl or

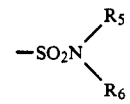

in which $R_5$ is $C_1$–$C_8$alkyl or phenyl which is unsubstituted or substituted by $C_1$–$C_4$alkyl, and $R_6$ is hydrogen or $C_1$–$C_8$alkyl, $R_3$ is hydrogen, halogen or $C_1$–$C_8$alkyl, and $R_4$ is hydrogen or halogen. The dye mixture is distinguished by generally good properties, in particular by good exhaustion.

17 Claims, No Drawings

RED DYE MIXTURES AND THEIR USE: DYEING NATURAL OR SYNTHETIC POLYAMIDES

The present invention relates to mixtures of red-dyeing dyes which are suitable for the dyeing of natural or synthetic textile polyamide fibre material from an aqueous bath and have very good fastness properties and show good exhaustion especially in combination with other dyes, in particular from short liquors.

The present invention relates to a dye mixture containing a dye of the formula

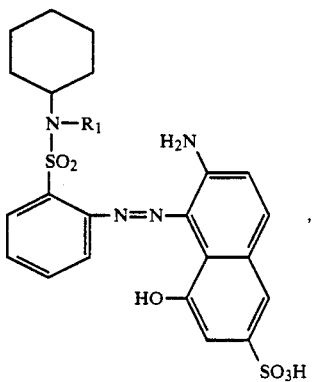
(1)

in which $R_1$ is methyl or ethyl and at least one dye of the formula

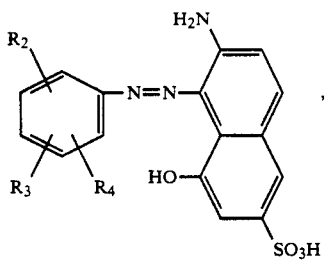
(2)

in which $R_2$ is substituted or unsubstituted $C_1$–$C_8$alkyl, halogen, benzoylamino which is unsubstituted or substituted in the phenyl ring by halogen, or 1-azacycloheptane-N-sulfonyl or

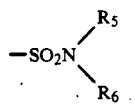

in which $R_5$ is $C_1$–$C_8$alkyl or phenyl which is unsubstituted or substituted by $C_1$–$C_4$alkyl, and $R_6$ is hydrogen or $C_1$–$C_8$alkyl, $R_3$ is hydrogen, halogen or $C_1$–$C_8$alkyl and $R_4$ is hydrogen or halogen.

Examples of suitable $R_2$, $R_3$, $R_5$ and $R_6$ radicals in formula (2) as $C_1$–$C_8$alkyl are, independently of one another, methyl, ethyl, propyl, isopropyl, n-butyl, sec-butyl, tert-butyl, isobutyl, pentyl, hexyl, heptyl and octyl. $R_2$, $R_3$, $R_5$ and $R_6$ are preferably $C_1$–$C_4$alkyl.

$R_2$ as $C_1$–$C_8$alkyl can be substituted, for example, by halogen, for example chlorine or bromine and in particular fluorine. An example is trifluoromethyl.

Examples of suitable $R_2$, $R_3$ and $R_4$ radicals as halogen are, independently of one another, fluorine, bromine or in particular chlorine.

$R_2$ as benzoylamino can be substituted in the phenyl ring by halogen, for example fluorine, bromine or in particular chlorine.

$R_5$ as phenyl can be substituted by $C_1$–$C_4$alkyl, for example methyl, ethyl, propyl, isopropyl, n-butyl, sec-butyl, tert-butyl or isobutyl, in particular methyl.

Preference is given to a dye mixture containing at least one dye of the formula (2) in which $R_2$ is trifluoromethyl, chlorine, —SO$_2$N(n-C$_4$H$_9$)$_2$, 1-azacycloheptane-N-sulfonyl, benzoylamino which is unsubstituted or substituted in the phenyl ring by chlorine, or phenylaminosulfonyl which is unsubstituted or substituted in the phenyl ring by methyl, and one dye of the formula (1).

Preference is also given to a dye mixture containing at least one dye of the formula (2) in which $R_3$ is hydrogen, methyl, or chlorine, and one dye of the formula (1).

Furthermore, preference is given to a dye mixture containing at least one dye of the formula (2) in which $R_4$ is hydrogen or chlorine, in particular hydrogen, and one dye of the formula (1). The abovementioned preferred dye mixtures in particular contain a dye of the formula (1) in which $R_1$ is methyl.

Particular preference is given to a dye mixture containing at least one dye of the formula (2) in which $R_2$ is trifluoromethyl, chlorine, —SO$_2$N(n-C$_4$H$_9$)$_2$, 1-azacycloheptane-N-sulfonyl, benzoylamino which is unsubstituted or substituted in the phenyl ring by chlorine, or phenylaminosulfonyl which is unsubstituted or substituted in the phenyl ring by methyl, $R_3$ is hydrogen, methyl or chlorine, and $R_4$ is hydrogen or chlorine, in particular hydrogen, and one dye of the formula (1) in which $R_1$ is methyl or ethyl, in particular methyl.

Very particular preference is given to a dye mixture containing a dye of the formula (1) in which $R_1$ is methyl or ethyl, in particular methyl, and at least one dye of the formulae (3) to (9):

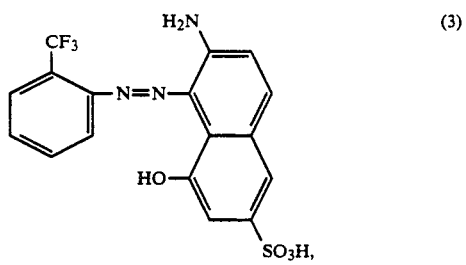
(3)

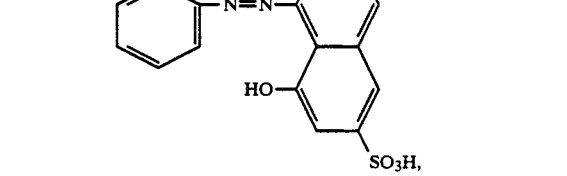
(4)

-continued

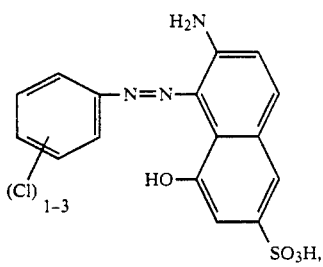
(4)

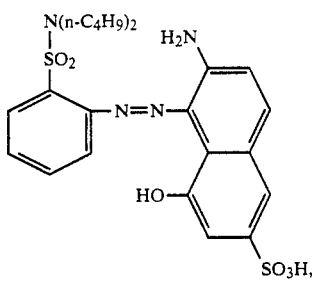
(6)

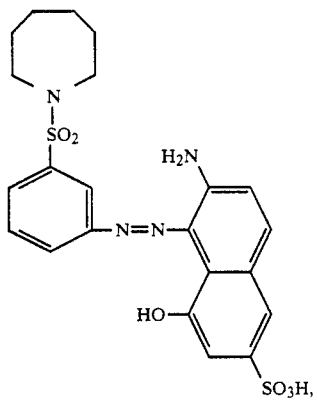
(7)

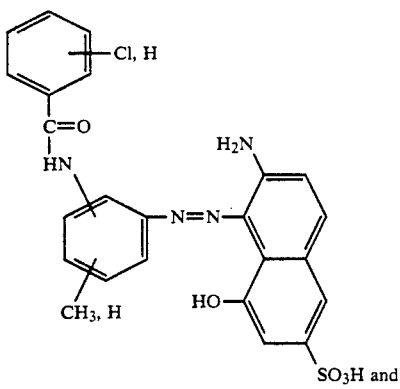
(8)

and

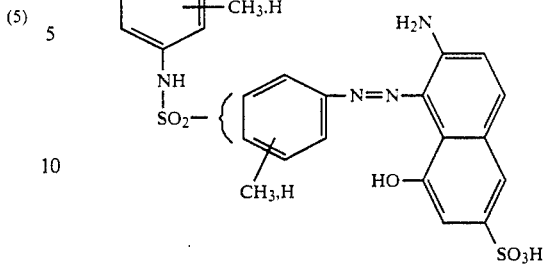
(9)

in which in the dye of the formula (9) the phenylaminosulfonyl group is bound to the phenyl ring in the 3- or 4-position. The very particularly preferred dye mixtures thus contain a dye of the formula (1) and at least one of the dyes of the formula (3), (4), (5), (6), (7), (8) and (9).

A dye mixture containing a dye of the formula (1) in which $R_1$ is methyl or ethyl, in particular methyl, and at least one dye of the formulae (3), (4), (6), or (7) is very particularly important.

In the dye mixtures according to the invention, the ratio of the dyes of the formulae (1) to (2) or the ratio of the dyes of the formulae (1) to (3), (4), (5), (6), (7), (8) or (9), of 10:90 to 90:10 and in particular 40:60 to 60:40 is preferred. The ratio of the dyes of the formulae (1) to (2) and in particular the ratio of the dyes of the formulae (1) to (3), (4), (5), (6), (7), (8) or (9) of 55:45 to 45:55 is very particularly preferred.

The dyes of the formulae (1) and (2) are known per se or can be prepared in analogy to known dyes.

The dye mixture according to the invention can be prepared by mixing the individual dyes. This mixing process is carried out, for example, in suitable mills, for example ball and pinned-disc mills, and in kneaders or mixers.

Furthermore, the dye mixtures can be prepared by spray-drying of the aqueous dye mixtures.

Furthermore, the dye mixtures according to the invention can be prepared by mixed synthesis, for example by reacting 2-cyclohexyl-N-methylaminosulfonylaniline (or 2-cyclohexyl-N-ethylaminosulfonylaniline) and the diazo component of the second mixing component with 1-hydroxy-7-aminonaphthalene-3-sulfonic acid. The reaction is carried out, for example, by diazotization in aqueous mineral acid solution at low temperature and coupling at acidic, neutral to akaline pH values.

The invention furthermore relates to a process for the dyeing and printing of natural or synthetic polyamide materials by means of a dye mixture containing the dye of the formula (1) and at least one dye of the formula (2). Examples of suitable synthetic polyamide materials are nylon-6,6 or nylon-6 fibre materials and an example of a suitable natural polyamide material is wool. The customary dyeing and printing processes are employed for the dyeing and printing.

The dye mixture containing the dye of the formula (1) and at least one dye of the formulae (2) is suitable in particular for the dyeing and printing in combination with other dyes and in particular for the dyeing and printing by the trichromatic principle. Trichromatic dyeing is understood as an additive dye mixing of three suitably chosen yellow-, red- and blue-dyeing dyes in the amounts necessary for obtaining the desired shade.

The dye mixture according to the invention is suitable in particular for the dyeing from short liquors, for example in continuous dyeing processes or batchwise and continuous foam-dyeing processes.

The dye mixture according to the invention is distinguished by generally good properties, for example good solubility, stability of the solution in the cold, good exhaustion and in particular by good compatibility with other dyes and uniformly good exhaustion onto different fibre materials.

The textile material to be dyed or printed can be present in a wide range of processing forms, for example as fibre, yarn, woven or knitted fabrics and in particular in the form of carpets.

In the dye mixture according to the invention, the dyes of the formulae (1) and (2) are present either in the form of their free sulfonic acid or preferably as their salts, for example the alkali metal salts, alkaline earth metal salts or ammonium salts or as the salts of an organic amine. Examples are the sodium salts, lithium salts or of an organic amine. Examples are the sodium salts, lithium salts or ammonium salts or the salt of triethanolamine. As a rule, the dye mixture contains further additives, for example common salt or dextrin.

The dye liquors or printing pastes can also contain further additives, for example wetting agents, antifoams, levelling agents or agents affecting the property of the textile material, for example softening agents, additives for flameproofing, or soil-, water- and oil-repellent agents and water-softening agents and natural or synthetic thickeners, for example alginates and cellulose ethers. In the examples which follow, parts are by weight. The temperatures given are in degrees centigrade. Parts by weight relate to parts by volume as the gram relates to the cubic centimeter.

EXAMPLE 1

To prepare the dye mixture containing a dye of the formula

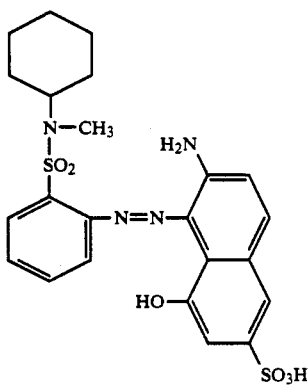
(101)

and a dye of the formula

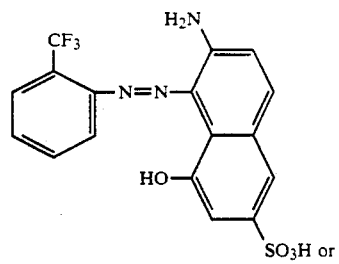
(102)

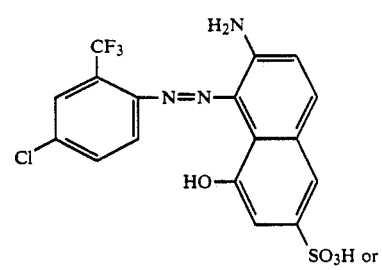
(103)

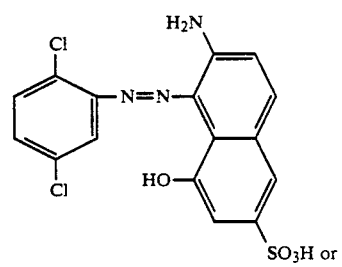
(104)

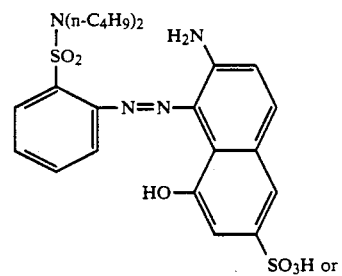
(105)

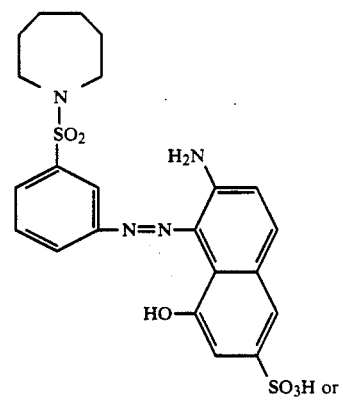
(106)

-continued (107)
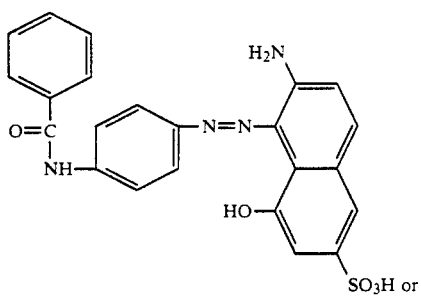

SO₃H or (108)
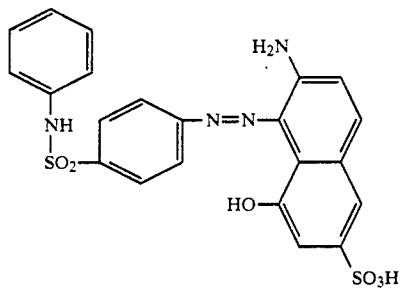

(109)
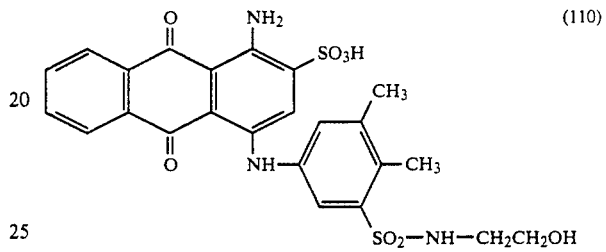

and 0.13% of the blue dye of the formula (110)

or a dye of the formulae (101), (104) and (106), in a mixer, a) 30 parts of the dye of the formula (101) and 70 parts of the dye of the formula (102) are mixed homogeneously to give 100 parts of the mixture which hereinafter is called dye mixture A;

b) 60 parts of the dye of the formula (101) and 40 parts of the dye of the formula (103) are mixed homogeneously to give 100 parts of the mixture which hereinafter is called dye mixture B;

c) 90 parts of the dye of the formula (101) and 10 parts of the dye of the formula (104) are mixed homogeneously to give 100 parts of the mixture which hereinafter is called dye mixture C;

d) 30 parts of the dye of the formula (105) and 70 parts of the dye of the formula (101) are mixed homogeneously to give 100 parts of the mixture which hereinafter is called dye mixture D;

e) 60 parts of the dye of the formula (106) and 40 parts of the dye of the formula (101) are mixed homogeneously to give 100 parts of the mixture which hereinafter is called dye mixture E;

f) 80 parts of the dye of the formula (107) and 20 parts of the dye of the formula (101) are mixed homogeneously to give 100 parts of the mixture which hereinafter is called dye mixture F;

g) 90 parts of the dye of the formula (108) and 10 parts of the dye of the formula (101) are mixed homogeneously to give 100 parts of the mixture which hereinafter is called dye mixture G;

h) 50 parts of the dye of the formula (101), 25 parts of the dye of the formula (104) and 25 parts of the dye of the formula (106) are mixed homogeneously to give 100 parts of the mixture which hereinafter is called dye mixture H.

EXAMPLE 2

10 parts of a nylon-6,6 fibre material (Helanca fabric) are dyed in 500 parts of an aqueous liquor containing 2 g/l of ammonium acetate and having a pH which has been adjusted to 5 with acetic acid. The dyes which are used are 0.12% of the red dye mixture A according to Example 1a), 0.27% of the yellow dye of the formula the amounts given being based on the weight of the fibres. The dyeing time at a temperature of 60° to 98° is 30 to 90 minutes. The dyed nylon-6,6 fibre material is then removed from the liquor and rinsed and dried as usual. This gives a piece of fabric completely levelly dyed in a neutral brown shade having no material-related streaks whatever.

Instead of 0.13% of the dye of the formula (110), it is also possible to use an equimolar amount of the dye C.I. Acid Blue 40, C.I. Acid Blue 258, C.I. Acid Blue 324 or C.I. Acid Blue 336 in Example 2. Likewise, instead of 0.27% of the dye of the formula (109), it is possible to use an equimolar amount of the dye C.I. Acid Yellow 199 or C.I. Acid Yellow 219 in Example 2.

EXAMPLES 3 TO 9

Example 2 is repeated, using the dyes of the formulae (109) and (110) listed in Table 1 below and the dye mixtures from Example 1 instead of 0.12% of the red dye mixture A and 0.27% of the yellow dye of the formula (109) and 0.13% of the blue dye of the formula (110), to give the pieces of fabric dyed completely levelly in the shade given.

TABLE 1

| Example | Dyes used | Shade |
|---|---|---|
| 3 | 0.18% of dye mixture B | reddish |
|   | 0.18% of the dye of the formula (109) | brown |
|   | 0.077% of the dye of the formula (110) |  |
| 4 | 0.04% of dye mixture C | olive |
|   | 0.25% of the dye of the formula (109) |  |
|   | 0.14% of the dye of the formula (110) |  |
| 5 | 0.12% of dye mixture D | neutral |
|   | 0.27% of the dye of the formula (109) | brown |
|   | 0.13% of the dye of the formula (110) |  |
| 6 | 0.17% of dye mixture E | reddish |
|   | 0.18% of the dye of the formula (109) | brown |
|   | 0.07% of the dye of the formula (110) |  |
| 7 | 0.036% of dye mixture F | olive |
|   | 0.25% of the dye of the formula (109) |  |
|   | 0.124% of the dye of the formula (110) |  |
| 8 | 0.19% of dye mixture G | reddish |
|   | 0.18% of the dye of the formula (109) | brown |
|   | 0.07% of the dye of the formula (110) |  |
| 9 | 0.12% of dye mixture H | neutral |

TABLE 1-continued

| Example | Dyes used | Shade |
|---------|-----------|-------|
|  | 0.27% of the dye of the formula (109)<br>0.15% of the dye of the formula (110) | brown |

The procedure of Example 2 is repeated, except that 0.12% of a red dye mixture consisting of 60 parts of the dye of the formula

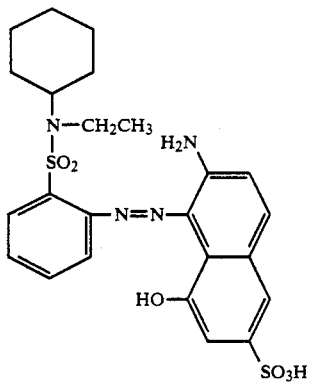

(111)

and 40 parts of the dye of the formula (103) or 0.12% of a red dye mixture consisting of 60 parts of the dye of the formula (111) and 40 parts of the dye of the formula (106) are used instead of 0.12% of the red dye mixture A, to give pieces of fabric dyed completely levelly in a neutral brown shade.

EXAMPLE 10

10 parts of a nylon-6,6 yarn are dyed in 400 parts of an aqueous liquor containing 1.5 g/l of ammonium acetate and having a pH which has been adjusted to 5.5 with acetic acid. The dyes which are used are 0.12% of dye mixture B, 0.27% of the dye of the formula (109) and 0.13% of the dye of the formula (110), the amounts given being based on the weight of the fibres. The dyebath is heated to 98° over a period of 30 minutes and maintained at 96° to 98° for 60 minutes. The dyed yarn is then removed from the dyebath and rinsed and dried as usual. This gives a yarn dyed in a neutral brown shade.

EXAMPLE 11

(Exhaust Dyeing Process For Carpets)

A beam dyeing apparatus (laboratory piece-dyeing apparatus, Model 10 from Rudolf Then) comprises, as its main parts, a horizontal dye boiler equipped with cooling jacket and connected with a secondary boiler which contains a special reversible pump to produce a circulation system.

This dyeing apparatus is entered with a beam charged with a nylon-6 loop pile carpet of 50 cm in width, 135 cm in length and a weight of 380 g. 6 liters of softened water were poured into the secondary boiler and 60 ml of 2N sodium hydroxide solution were added. By opening the corresponding valves (secondary boiler and connecting lines, pump/dye boiler), the liquor flows from the secondary boiler by gravity into the dye boiler, while the air displaced flows into the secondary boiler through a vent line. After the dyeing apparatus has been filled, the liquor remaining in the secondary boiler has a height of about 5 cm and then the circulating pump is turned on. To control the pH, a hole is drilled into the pipeline between the dye and secondary boiler (direction of flow) and a combination glass electrode is inserted. The dye liquor is circulating during the entire dyeing process from inside to outside, while the pressure gradient is 0.1 to 0.2 bar, and the delivery of the pump is about 6 liters per minute. The liquor is heated to 98°, and 7.6 g of an anionic levelling agent of high fibre affinity, dissolved in 100 ml of water, is added to the secondary boiler over a period of 5 minutes.

The dyeing temperature is adjusted to 97° to 98°, while the pH is 10.7. The pH of the sample removed from the dyebath and cooled to 20° is 11.9.

2.5 g of the red dye mixture B and 1.8 g of the yellow dye of the formula (109), both dissolved in 200 ml of hot water, are run in to the secondary boiler from a dropping funnel over a period of 10 minutes. After 30 minutes, a total of 100 ml of 1N sulfuric acid are metered in by means of a piston burette at a rate of 5.5 ml per minute over a period of 10 minutes and at a rate of 2.25 ml per minute over a further period of 20 minutes.

After another 10 minutes, the pH is 3.8. The dyebath is exhausted, i.e. more than 99% of the dyes has been absorbed by the material to be dyed. The heating is turned off, and the dye liquor is cooled to 60° by means of indirect cooling. During this time, the pH increases to 3.9. The almost water-clear liquor is pumped back into the secondary boiler, and the beam is removed. The carpet material is unwound, centrifuged and dried. The nylon-6 loop pile carpet has been dyed uniformly levelly orange.

What is claimed is:

1. A dye mixture which contains a dye of the formula

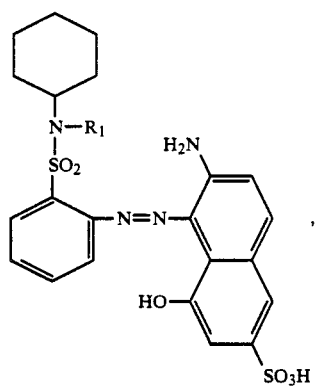

(1)

in which $R_1$ is methyl or ethyl and at least one dye of the formula (2)

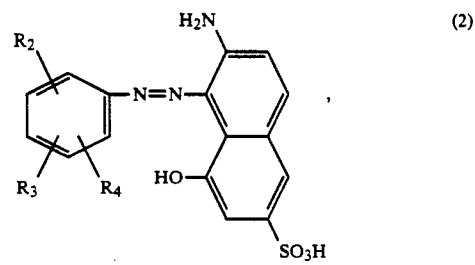

(2)

in which $R_2$ is substituted or unsubstituted $C_1$–$C_8$alkyl, halogen, benzoylamino which is unsubstituted or substituted in the phenyl ring by halogen, or 1-azacycloheptane-N-sulfonyl or

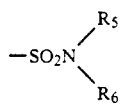

in which $R_5$ is $C_1-C_8$alkyl or phenyl which is unsubstituted or substituted by $C_1-C_4$alkyl, and $R_6$ is hydrogen or $C_1-C_8$alkyl, $R_3$ is hydrogen, halogen or $C_1-C_8$alkyl, and $R_4$ is hydrogen or halogen.

2. A dye mixture according to claim 1, which contains a dye of the formula (2) in which $R_2$ is trifluoromethyl, chlorine, $-SO_2N(n-C_4H_9)_2$, 1-azacycloheptane-N-sulfonyl, benzoylamino which is unsubstituted or substituted in the phenyl ring by chlorine, or phenylaminosulfonyl which is unsubstituted or substituted in the phenyl ring by methyl.

3. A dye mixture according to claim 1, which contains a dye of the formula (2) in which $R_3$ is hydrogen, methyl, or chlorine.

4. A dye mixture according to claim 1, which contains a dye of the formula (2) in which $R_4$ is hydrogen or chlorine.

5. A dye mixture according to claim 1, which contains a dye of the formula (1) in which $R_1$ is methyl or ethyl, and at least one dye of the formula (2) in which $R_2$ is trifluoromethyl, chlorine, $-SO_2N(n-C_4H_9)_2$, 1-azacycloheptane-N-sulfonyl, benzoylamino which is unsubstituted or substituted in the phenyl ring by chlorine, or phenylaminosulfonyl which is unsubstituted or substituted in the phenyl ring by methyl, $R_3$ is hydrogen, methyl or chlorine and $R_4$ is hydrogen or chlorine, in particular hydrogen.

6. A dye mixture according to claim 5, which contains as dye of the formula (2) at least one dye of the formulae (3) to (9)

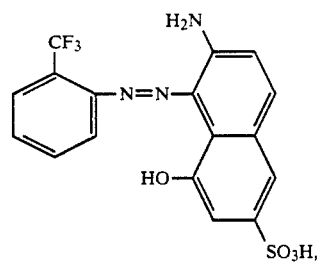

(3)

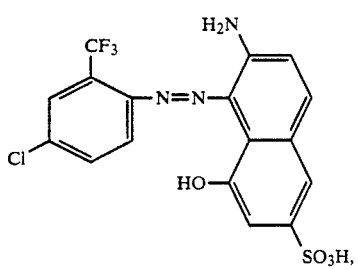

(4)

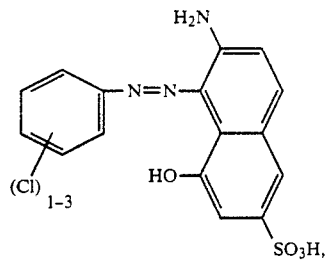

(5)

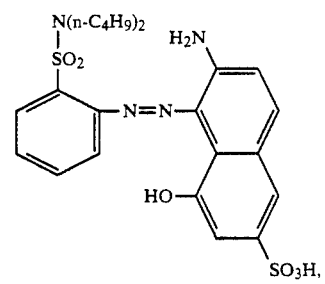

(6)

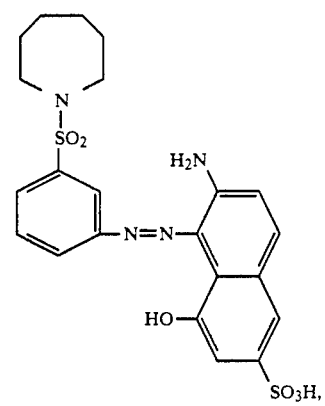

(7)

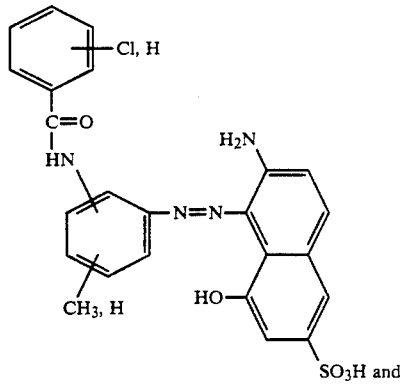

(8)

and

-continued

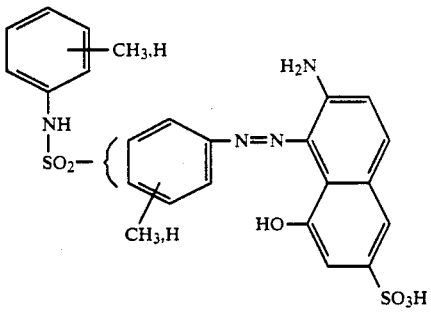
(9)

7. A dye mixture according to claim 1, wherein the ratio of the dyes of the formulae (1) to (2) is 10:90 to 90:10.

8. A dyeing or printing preparation containing a dye mixture according to claim 1.

9. A dye mixture of claim 4 wherein $R_4$ is hydrogen.

10. A dye mixture of claim 5 wherein $R_1$ is methyl.

11. A dye mixture of claim 7 wherein the ratio is 40:60 to 60:40.

12. A dye mixture of claim 7 wherein the ratio is 45:55 to 55:45.

13. A method of dyeing or printing a natural or synthetic polyamide material which comprises contacting the polyamide material with a tinctorally effective amount of a dye mixture of claim 1.

14. A method of claim 13 wherein the dye mixture is used in combination with other dyes.

15. A method for the trichromatic dyeing of a natural or synthetic polyamide material which comprises contacting the polyamide material with a tinctorally effective amount of a trichromatic mixture of dyes consisting of a dye mixture of claim 1 in combination with at least one yellow or orange dye and at least blue dye.

16. A material dyed or printed according to claim 13.

17. A material of claim 16 which is a textile material.

* * * * *